(12) United States Patent
Schubert

(10) Patent No.: US 6,306,537 B2
(45) Date of Patent: *Oct. 23, 2001

(54) IMPACT MODIFIED POLYSTYRENE SEALS FOR GALVANIC CELLS

(75) Inventor: Mark A. Schubert, Brooklyn, OH (US)

(73) Assignee: Eveready Battery Company, Inc., St. Louis, MO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/222,144

(22) Filed: Dec. 29, 1998

(51) Int. Cl.[7] ...................................................... H01M 2/12

(52) U.S. Cl. ............................ 429/54; 429/174; 429/185

(58) Field of Search ................................. 429/54, 53, 57, 429/59, 60, 61, 90, 174, 185, 180, 56, 55, 129, 130

(56) References Cited

U.S. PATENT DOCUMENTS

| 4,343,869 | 8/1982 | Oltman et al. . |
| 5,395,890 | 3/1995 | Nakano et al. . |
| 5,908,898 | * 6/1999 | Wan-Cheng et al. ................ 525/185 |
| 6,071,643 | 6/2000 | Chino et al. . |

FOREIGN PATENT DOCUMENTS

| 97180689 | 7/1997 | (JP) . |
| WO 94/22175A | 9/1994 | (WO) . |

* cited by examiner

Primary Examiner—Stephen Kalafut
Assistant Examiner—R. Alejandro
(74) Attorney, Agent, or Firm—Stewart A. Fraser

(57) ABSTRACT

A seal for a galvanic cell is formed of a styrenic polymer blend including a styrenic polymer and an impact modifying agent which increases the toughness of the styrenic polymer. The styrenic polymer based seal has several advantageous over conventional galvanic cell seals, including better processability, and improved chemical resistance to alkaline medium.

31 Claims, 7 Drawing Sheets

IMPACT MODIFIED POLYSTYRENE SEALS FOR GALVANIC CELLS

BACKGROUND OF THE INVENTION

This invention relates to improved seals for alkaline galvanic cells.

Seals for galvanic cells have generally been made from nylon, polypropylene or polysulfone. In the case of alkaline galvanic cells, nylon has been highly preferred, especially nylon 66. However, nylon seals for alkaline galvanic cells have major disadvantages. First, nylon absorbs moisture making it susceptible to hydrolytic degradation in a corrosive electrolyte. As a result of the tendency for nylon to absorb moisture, it must be dried prior to molding. After molding, the dimensions and properties of the resulting seal are affected by the tendency of nylon to absorb moisture. Hydrolytic degradation of nylon occurs through chain scission of amide bonds. Chain scission embrittles the material leading to seal failure and leakage of the cell. To overcome this, protective coatings are sometimes used on the internal side of the seal. In particular, nylon seals for alkaline galvanic cells are generally provided with an coating of asphalt. Application of the asphalt coating involves additional steps and materials which increase the overall cost of the seal.

Another problem with nylon seals for alkaline galvanic cells is that they have a relatively high ultimate elongation. For safety reasons, seals for alkaline galvanic cells are designed to provide controlled release of pressure in the event that the internal pressure of the galvanic cell increases beyond an acceptable limit. This is achieved by forming the seal with a relatively thin portion which is designed to rupture if the internal pressure of the galvanic cell increases beyond an acceptable limit. Sufficient space must be provided within the cell to allow the thin portion to extend and rupture. Under normal moisture conditions, nylon extends over 300% of its initial length. This high level of elongation requires large amounts of internal cell space which limits the seal and cell design. Accordingly, it would be desirable to utilize a material for seal construction which meets the necessary physical and chemical requirements for use as a seal material in an alkaline cell, and which has a relatively lower ultimate elongation.

Another disadvantage with nylon galvanic cell seals is that the physical properties of the seal are dependent upon the moisture content of the nylon. In particular, the strength of a nylon seal is dependent upon its moisture content. The moisture content of the nylon seal is dependent upon the relative humidity of the environment in which it is stored. Accordingly, the vent pressure (i.e., the pressure at which the thin portion of the seal ruptures) of nylon galvanic cell seals is undesirably dependent on relative humidity.

Galvanic cell seals made of polypropylene are subject to extensive softening at the high end of possible use temperatures, i.e., 75–85° C. This softening results in lower deflection temperatures under load and excessive stress relaxation in the compressive sealing zones of the seal and hence leakage of electrolyte and unreliable cell performance.

The use of polysulfone as a material for making galvanic cell seals has been relatively limited on account of its relatively high cost (approximately 2.5 times the cost of nylon 66). In addition to its relatively high cost, polysulfone also has a tendency to absorb moisture, and must be dried to a moisture content of less than or about 0.02% before it can be molded into a seal. This extra step of drying polysulfone before it can be molded further increases the overall cost of forming a galvanic cell seal from polysulfone.

SUMMARY OF THE INVENTION

The inventor has discovered that galvanic cell seals having improved performance characteristics and other advantages, as compared with known seals can be made or comprised of an impact modified styrenic polymer. In particular, as compared with conventional seals, especially nylon, seals comprised of impact modified styrenic polymer exhibit excellent chemical resistance to alkaline medium, absorb very little water, have a low coefficient of linear thermal expansion, exhibit good heat resistance properties at higher pressures, cool quickly after molding, have a low melt viscosity, have relatively low tensile strength, have high impact toughness, have a relatively high glass transition temperature, have a relatively low elongation to break, and higher hydrogen permeability. These properties result in a galvanic cell seal which can be manufactured at a much lower cost, and which exhibits excellent performance characteristics which do not vary significantly over the range of temperatures and relative humidity encountered during cell use.

DESCRIPTION OF THE PREFERRED EMBODIMENTS

Figure 1:
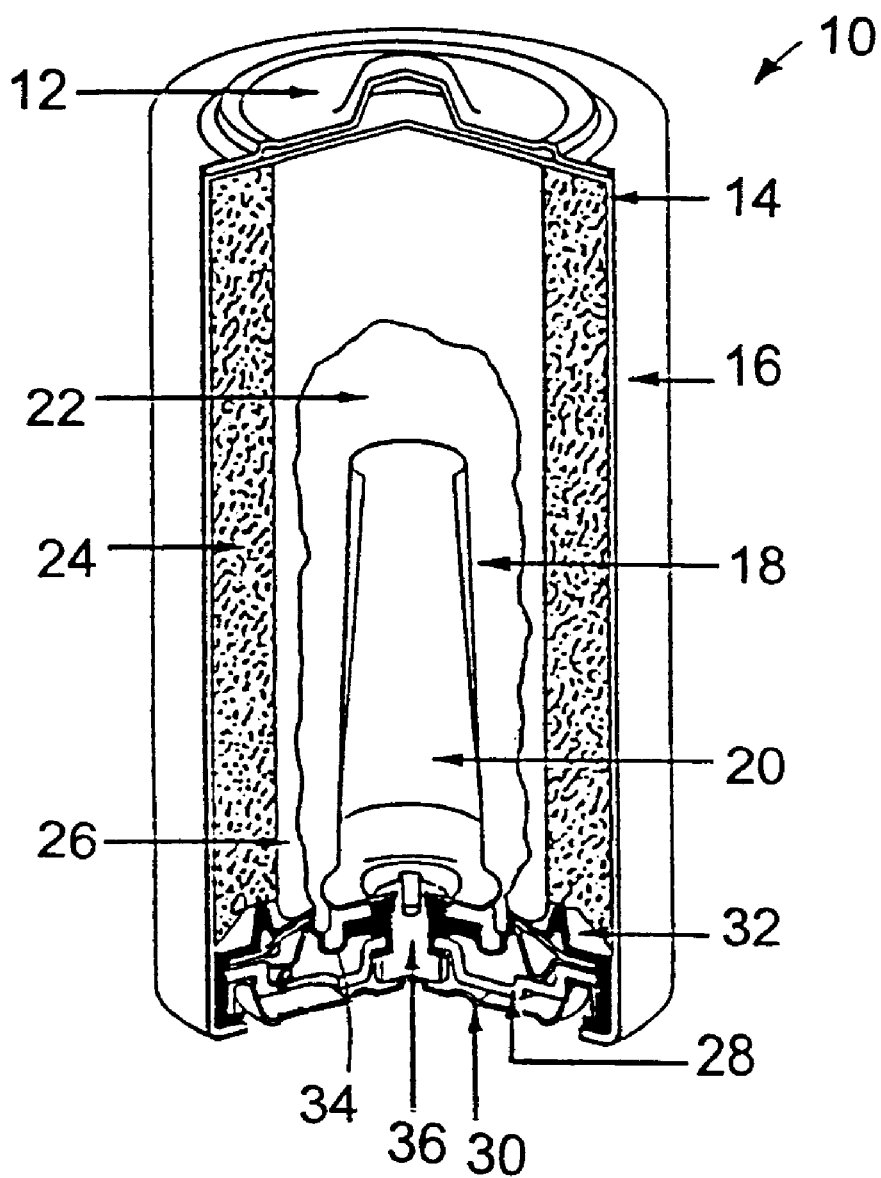
FIG. 1 is a perspective view of a typical cylindrical alkaline cell with portions broken away to show the construction thereof.

Shown in FIG. 1 is a typical cylindrical alkaline galvanic cell or battery 10. Battery 10 includes a plated steel positive cover 12, a steel can 14, a metallized plastic film label 16, powdered zinc anode 18, brass current collector 20, potassium hydroxide electrolyte 22, a manganese dioxide and carbon cathode 24, a non-woven fabric separator 26, a steel inner cell cover 28, and a plated steel negative cover 30.

Interposed between the alkaline potassium hydroxide electrolyte 22 and steel inner cell cover 28 is a seal 32. Seal 32 performs four important functions. First, it serves as an electrical insulator which electrically isolates steel can 14 from the anode. Second, seal 32 prevents electrolyte[s] from leaking from the battery. Third, seal 32 includes a relatively thin area 34 which is designed to rupture in the event that the internal pressure of the battery exceeds a predetermined limit. Fourth, seal 32 influences the rate of gas transmission, particularly hydrogen gas egress from the battery.

Seal 32 is made from, or comprised of, an impact modified polystyrene material. Preferred modified polystyrene materials may be comprised of a styrenic polymer blended with an impact modifier which reduces the brittleness of the styrene and increases its toughness. Examples of suitable styrenic polymers include general purpose polystyrene (GPPS) and syndiotactic polystyrene (SPS). General purpose polystyrene is an amorphous, widely used commodity polymer which is extremely brittle at galvanic cell use temperature, due to its glass transition temperature of 100° C. Syndiotactic polystyrene, which is sold under the trade name Questra® by Dow Chemical Company, is a semi-crystalline thermoplastic polymer. However, as opposed to the unordered atactic configuration of amorphous general purpose polystyrene, syndiotactic polystyrene is comprised of styrene monomer units arranged in a highly ordered alternating configuration along the polymer chain. This ordered structure allows the polymer chains to crystallize. The crystallinity improves the strength and heat resistance of the material near and above the glass transition temperature. Accordingly, on account of the improved heat resistance and strength properties, syndiotactic polystyrene is preferred. Other styrenic polymers which may be suitable for preparing the galvanic cell seals of the invention include styrenic copolymers and halogenated styrenic polymers.

Examples of suitable impact modifiers for reducing the brittleness and increasing the toughness of styrenic polymers include polyolefinic thermoplastic elastomers and tri-block copolymers with an elastomeric block between two rigid thermoplastic blocks. Examples of polyolefinic thermoplastic elastomers include those polymerized from ethylene, octane, and butylene monomer units which are copolymerized, such as in the presence of a metallocene catalyst, to produce saturated hydrocarbon rubbery materials. Preferred tri-block copolymer impact modifiers which may be used for preparing impact modified styrenic polymer blends from which galvanic cell seals may be prepared include those having thermoplastic blocks which are amorphous polystyrene. The amorphous polystyrene blocks provide improved miscibility in styrenic polymers such as SPS and GPPS as compared with polyolefinic elastomers. Preferred tri-block copolymer impact modifiers include styrene-butadiene-styrene (S-B-S), styrene-isoprene-styrene (S-I-S), styrene-ethylene/butylene-styrene (S-EB-S) and styrene-ethylene/propylene-styrene (S-EP-S) block copolymers. S-EB-S and S-EP-S copolymers are more preferred because they do not contain any sites of unsaturation, and are therefore less susceptible to oxidative degradation.

Another suitable impact modified styrenic polymer which can be used in the practice of this invention is high impact polystyrene (HIPS). High impact polystyrene is produced by dissolving polybutadiene rubber in styrene monomer. As styrene polymerizes it forms a continuous phase around discrete polybutadiene phases with occlusions of polystyrene. The styrene monomer is polymerized with traditional catalysts and is therefore in the atactic amorphous phase. Some of the rubber is chemically grafted to the polystyrene phase. Therefore, HIPS has excellent toughness through the intimate incorporation of the polybutadiene rubber.

Another preferred impact modified styrenic polymer is super high impact polystyrene, sold by Dow Chemical Company under the trade name AIM®. AIM® is a HIPS-like product with improved incorporation of the rubbery phase. Hence, AIM® is a very tough material and is an excellent material for preparing the seals of this invention. AIM® differs from impact modified general purpose polystyrene, impact modified syndiotactic polystyrene and conventional high impact polystyrene in that it exhibits improved plastic deformation characteristics. Specifically, AIM® can undergo a yield and ductile deformation similar to nylon. This allows the material to experience higher strains than impact modified general purpose polystyrene, impact modified syndiotactic polystyrene and conventional high impact polystyrene before cracking of the seal and leakage of the galvanic cells can occur.

The impact modified styrenic polymer blend used to prepare the galvanic cell seals preferably contain the minimum amount of impact modifier which is necessary to allow the seal to be installed into the galvanic cell without cracking or breaking when a nail 36 is installed through the seal and when the steel can is crimped to seal the cell. Unmodified styrenic materials such as general purpose polystyrene and syndiotactic polystyrene would be ideal materials for seals for galvanic cells containing an alkaline electrolyte because of their relatively low cost, good processing characteristics, moisture independent physical characteristics, and resistance to alkaline media. However, unmodified styrenic materials are excessively brittle and must be blended with an impact modifier before being molded into a battery seal. In the case of polyolefinic elastomer impact modifiers, suitable blends comprise from 60 to 95% by weight styrenic polymer and from 5 to 40% by weight of polyolefinic elastomer based on the total weight of styrenic polymer and polyolefinic elastomer impact modifier, with blends comprising from about 70 to about 95% by weight styrenic polymer and about 5 to about 30% by weight polyolefinic elastomer being preferred. In the case of tri-block copolymer impact modifiers, the impact modified styrenic polymer blends may contain from about 50 to about 95% by weight styrenic polymer and from about 5 to about 50% by weight tri-block copolymer impact modifier based on the total weight of styrenic polymer and impact modifier, and more preferably from about 70 to about 95% styrenic polymer by weight and from about 5 to about 30% tri-block copolymer by weight. In the case of high impact polystyrene and super high impact polystyrene, the styrenic polymer phase may comprise from about 60% to about 95%, and the rubbery phase may comprise from about 5% to about 40% by weight, based on the total weight of the styrenic phase and the rubbery phase.

The inventor has discovered that while seals prepared from the impact modified styrenic polymers described above exhibit several outstanding performance characteristics as compared with conventional nylon battery seals, the styrenic polymer seals can sometimes exhibit unacceptable leakage, especially at higher temperatures. This problem is due to the relatively high rate of stress relaxation of the styrenic polymer blends. This problem can be overcome by changing the design of the seal to counteract the effects of stress relaxation, e.g., such as by using a resilient or springy retainer or washer which acts on the seal to compensate for stress relaxation. However, as another alternative which does not require design changes, the styrenic polymer blends can be modified by adding an anti-stress relaxation agent. For example, poly(phenylene oxide) (PPO) can be added to the styrenic polymer blend to reduce stress relaxation. An amount of anti-stress relaxation which is effective to achieve a desired reduction in stress relaxation can be easily determined by those having ordinary skill in the art by conducting routine experiments. An example of a commercially available styrenic polymer blend exhibiting reduced stress relaxation is available from GE Plastics under the trade name NORYL®. The NORYL® products are a blend of HIPS and PPO. NORYL® EM6101 exhibits a suitable combination of properties for use as a battery seal material and will lower the overall cost of alkaline cells while allowing for even lower profile seals than nylon. Based on standardized bench top tests, NORYL® blends have better thermal, creep and stress relaxation resistance than nylon and other conventional materials. Adding PPO to styrenic seal materials does not decrease their chemical stability in the in-cell environment.

Other types of anti-stress relaxing agents include fillers such as talc, calcium carbonate, carbon black, silica and the like.

Various tests were conducted which demonstrate that the impact modified styrenic polymeric materials have certain performance characteristics which provide improved galvanic cell seal performance.

Potassium Hydroxide Compatibility Test

Potassium hydroxide compatibility tests were conducted on impact modified styrenic polymer compositions and compared with similar compatibility tests on nylon. The tests were conducted at high temperatures to accelerate degradation. The materials were not under stress. However, it is not expected that stress would dramatically influence the comparison.

Figure 2:
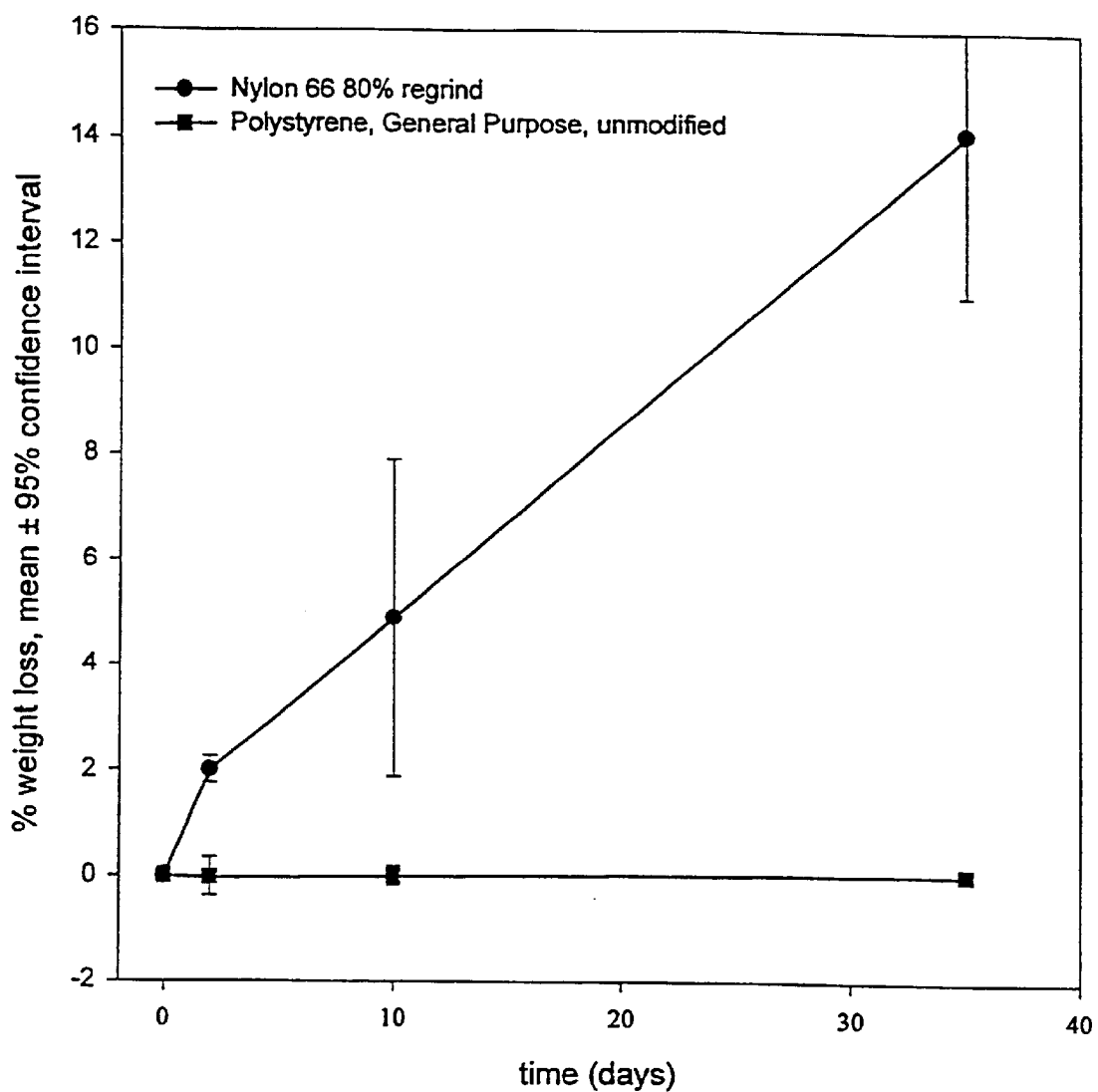
FIG. 2 is a graph showing a comparison of the percentage weight loss for a nylon tensile bar floated on a 37% potassium hydroxide solution in a fluoropolymer vial and placed in an oven at 130° C., and for a general purpose polystyrene tensile bar subjected to the same conditions.

Potassium hydroxide resistance for nylon and unmodified general polystyrene were compared by floating nylon and general purpose polystyrene tensile bars (⅛ inch thick) on a 37% potassium hydroxide solution in a fluoropolymer vial placed in an oven at 130° C. for 35 days. The bars were periodically removed, weighed and replaced into the solution. The results (shown in FIG. 2) indicate that the unmodified general purpose polystyrene tensile bar did not have an appreciable weight loss after 35 days, whereas the nylon 66 tensile bar had approximately a 14% weight loss after 35 days of exposure to the 37% potassium hydroxide solution at 130° C.

Figure 3:
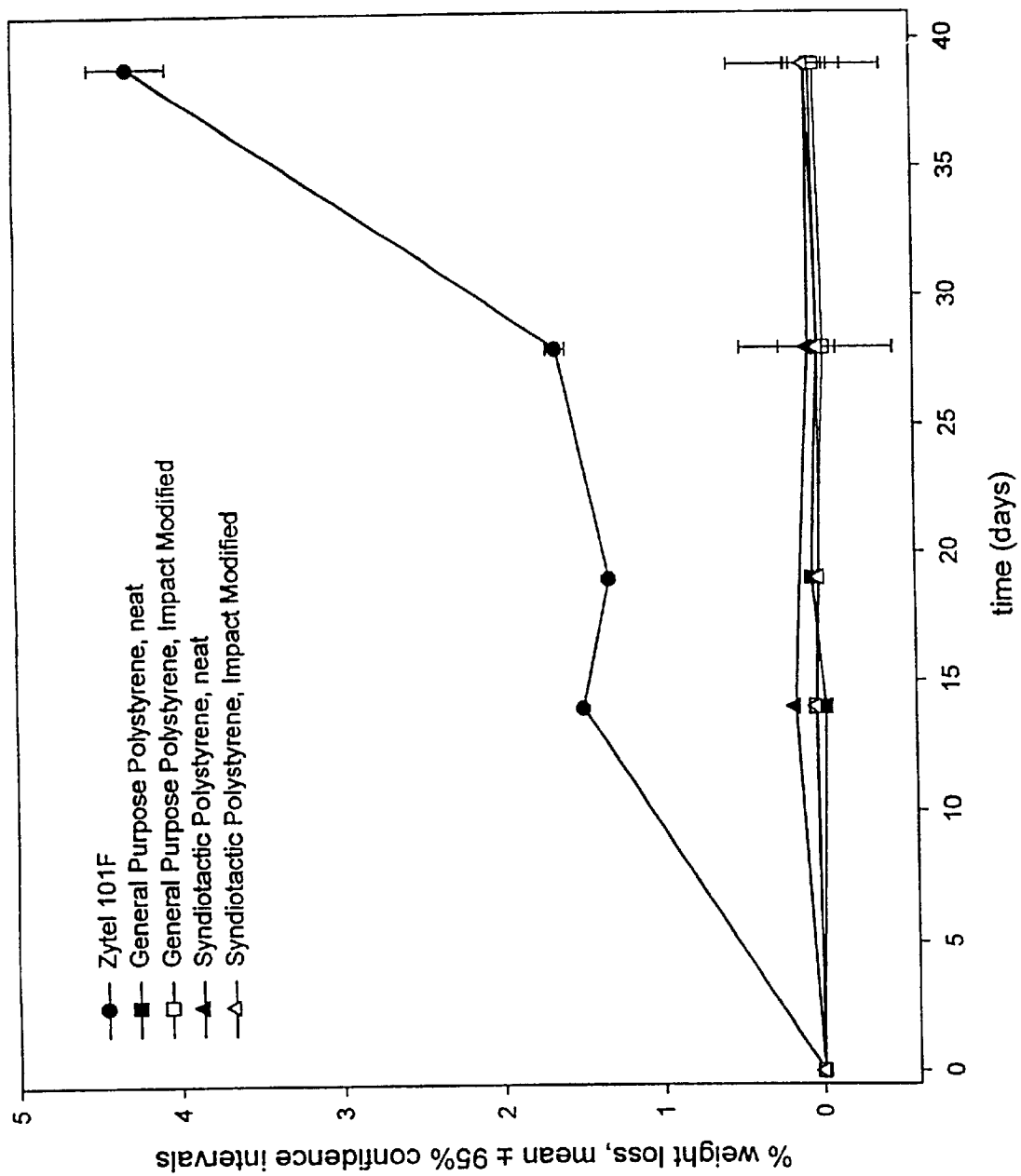
FIG. 3 is a comparison of percent weight loss for a nylon microtensile bar having a 0.009 inch thick section submerged in 37% potassium hydroxide solution in a sealed fluoropolymer bottle and placed in an oven at 95° C., and for a variety of different polystyrene based microtensile bars of identical size and shape which are subjected to identical conditions as the nylon microtensile bar.

Microtensile bars (1/32 inch thick) with a 0.009 inch thick section were molded from nylon (Zytel 101F), unmodified general purpose polystyrene, unmodified syndiotactic polystyrene, and impact modified syndiotactic polystyrene. Each of the microtensile bars were submerged in 37% potassium hydroxide solution in a sealed fluoropolymer bottle and placed in an oven at 95° C. for 39 days. The bars were periodically removed, weighed and replaced into the solution. The results (shown in FIG. 3) demonstrate that none of the styrenic polymer materials had any appreciable weight loss during the testing period, whereas the nylon microtensile bar had approximately a 4.5% weight loss after 39 days of exposure to the 37% potassium hydroxide solution at 95° C. The results shown in FIGS. 2 and 3 strongly suggest that the styrenic polymer based materials, whether modified or unmodified, are more resistant to degradation when exposed to potassium hydroxide than nylon.

Figure 4:
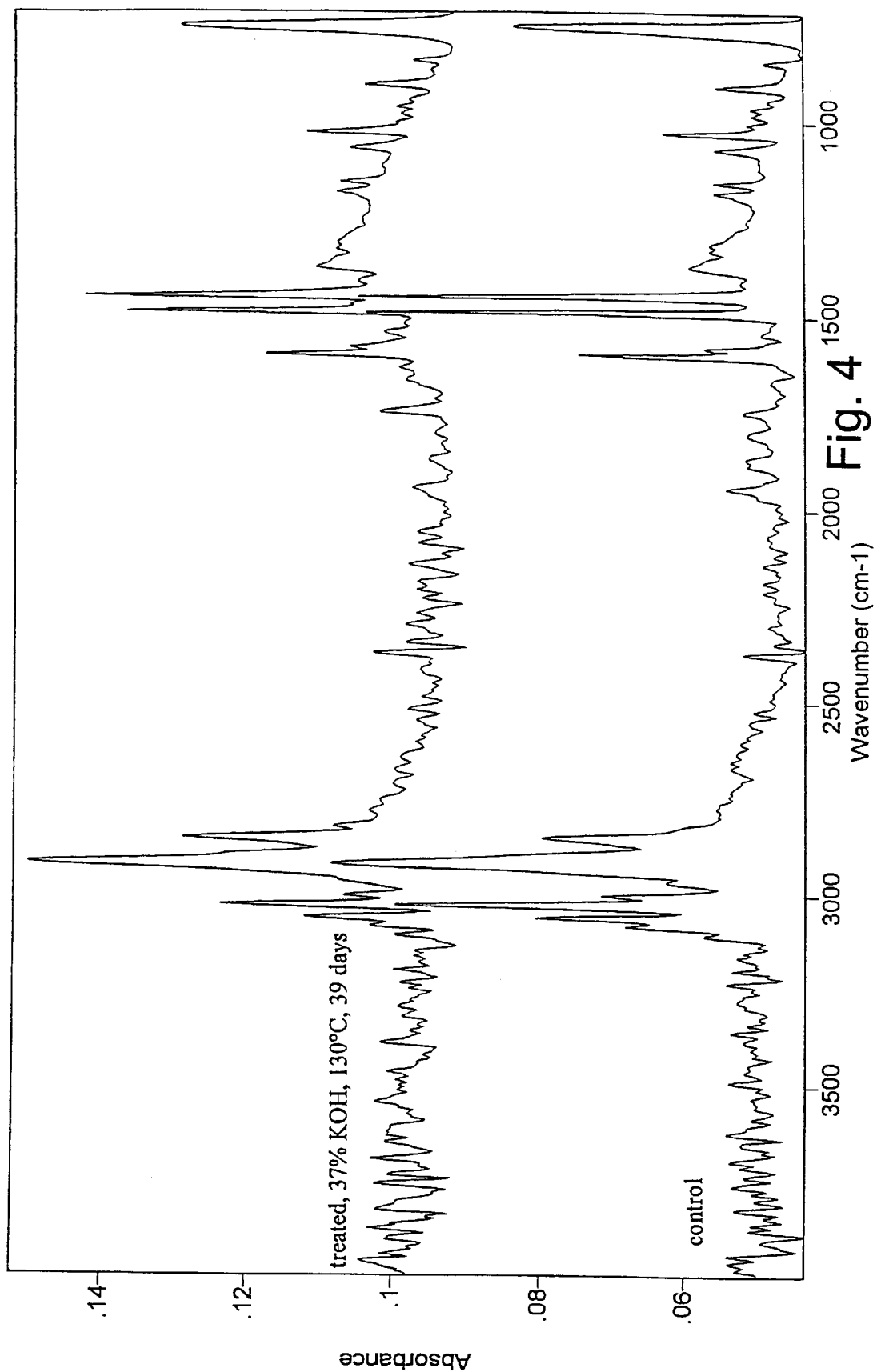
FIG. 4 is an attenuated total reflectance-fourier transform infrared (ATR-FTIR) spectrograph of the surface of an untreated sample of general purpose polystyrene compared with the spectrograph of the surface of a general purpose polystyrene sample which was treated by exposure to a 37% potassium hydroxide solution at 130° C. for 39 days.
Figure 5:
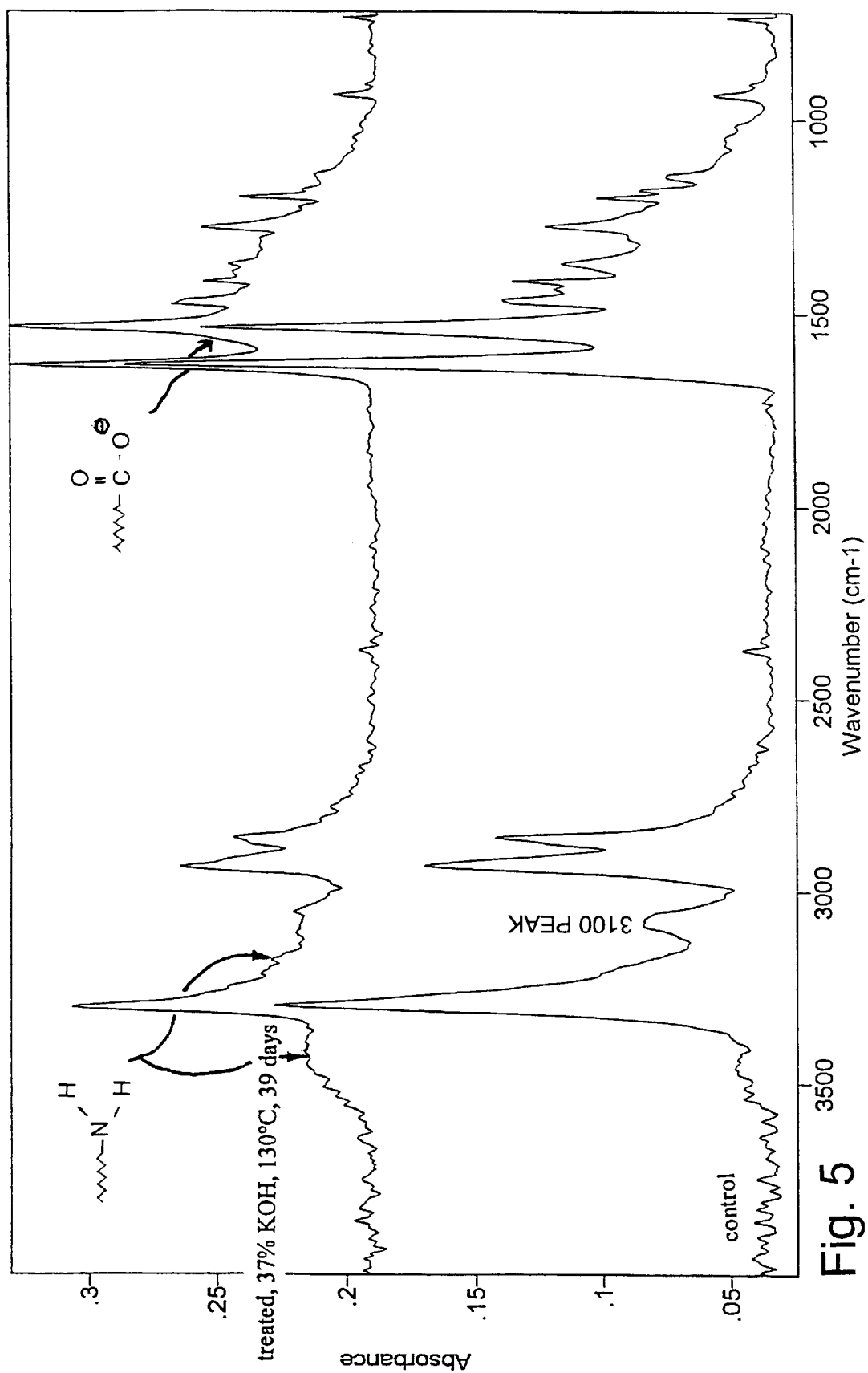
FIG. 5 is an ATR-FTIR spectrograph of the surface of an untreated nylon sample, compared with the surface of a nylon sample treated with exposure to a 37% potassium hydroxide solution at 130° C. for 39 days.

To verify that the styrenic materials are not degrading when exposed to potassium hydroxide, attenuated total reflectance-fourier transform infrared (ATR-FTIR) spectroscopy was used to evaluate any chemical changes at the surface of the specimens. FIG. 4 shows that the locations of the absorbent peaks and the relative heights of the peaks are about the same for general purpose polystyrene samples which have been untreated, and for those which have been exposed to a 37% potassium hydroxide solution at 130° C. for 39 days. Similar results were found for unmodified syndiotactic polystyrene, impact modified general purpose polystyrene, and impact modified syndiotactic polystyrene. The results confirm that no significant potassium hydroxide degradation has occurred on the surfaces of the styrenic polymer materials. In contrast, FIG. 5 shows many changes in the ATR-FTIR spectrograph of untreated nylon as compared with nylon which has been exposed to a 37% potassium hydroxide solution at 130° C. for 39 days. The changes in the spectrographs for the nylon samples are due to new peaks associated with degradation products of nylon. Two large changes are present at the 3,000–3,500 $cm^{-1}$ region where primary amine groups absorb, and at the 1500–1600 $cm^{-1}$ where carboxylic acid salts absorb. The amine peaks wash out the 3,100 $cm^{-1}$ peak and the carboxylic acid group is seen as a definite shoulder on the 1550 $cm^{-1}$ peak. The presence of the amine end groups is consistent with the anticipated degradation products based on the hydrolysis mechanism of nylon in water.

Gel permeation chromatography (GPC) was used to further characterize changes on the samples exposed to potassium hydroxide solutions. To concentrate on the exposed area of the samples, shavings taken from the surface were used to measure molecular weight. The results of the GPC analysis are shown in Table 1. The potassium hydroxide treatments decreased the nylon (Zytel) molecular weight by a factor of 25, and in the worst case, decreased the polystyrene molecular weight by, at most, 15%. However, that particular condition was a 130° C. test where the sample was floated on the surface of a 37% potassium hydroxide solution, and hence exposed to air. At 130° C. for 39 days, it is possible that the polystyrene may experience some thermal oxidative degradation. Even so, it has a small influence on molecular weight. The results demonstrate that the styrenic polymer based materials are much more stable in potassium hydroxide than nylon. The results suggest that nylon weight loss is due to the production of very low molecular weight degradation products which can dissolve into the aqueous environment, whereas the changes in molecular weight for the styrenic polymer samples were relatively modest in comparison.

TABLE 1

Weight Average Molecular Weight (Mw in Daltons), Mean ± S.D., n = 2

|  | GPPS | GPPS | GPPS-Impact Modified | Zytel 101F |
|---|---|---|---|---|
| Control (untreated) | 318,000 ± 83 | 303,200 ± 2500 | 316,800 ± 2500 | 65,700 ± 4200 |
| Treated in 37% KOH @ 95° C. for 35 days | 312,200 ± 1600 |  | 320,200 ± 200 | 2500 (n = 1) |
| Treated in 37% KOH @ 130° C. for 39 days |  | 257,300 ± 30 |  | 2700 ± 300 |

Initial Molding Trial

Galvanic cell seals were molded from 9 different lots of polystyrene, including tri-block modified general purpose polystyrene containing 10% and 20% tri-block impact modifier, tri-block modified syndiotactic polystyrene containing 10 and 20% tri-block impact modifier, polyolefinic impact modified general purpose polystyrene containing 10 and 20% impact modifier, polyolefinic impact modified syndiotactic polystyrene containing 10 and 20% olefinic impact modifier, and high impact polystyrene containing 7.5% butadiene rubber. The seals were installed in AA type batteries with minimum processing adjustments. All of the seals performed favorably with some cracking upon installation of the rivets. However, it must be understood that the molds used were designed to make nylon seals. The molds have dimensions which will be different from those of molds which are designed specifically for molding seals of impact modified styrenic polymer blends. This difference is attributable to the fact that the amount of moisture absorbed by the nylon is lower during molding than during use, which result in the nylon seal having different dimensions during use than immediately after molding. In contrast, the impact modified styrenic polymer blends do not absorb significant amounts of moisture and do not experience any appreciable dimensional changes during use, as compared with immediately after molding. It is expected that the cracking observed in some cases during installation of the impact modified styrenic polymer seals will be reduced or eliminated when molds specially designed for molding the styrenic polymer based seals are used.

Oxidation Testing

The HIPS and AIM® products both contain polybutadiene rubber. Polybutadiene rubber contains unsaturated bonds which are susceptible to oxidative attack. Oxidation of the rubber content will embrittle the material and change is performance. Alkaline galvanic seals were molded from HIPS with a thin section for rupture to relieve high internal cell pressures. The pressure at which the thin section ruptures is a function of the design and the material properties of the seal. The data (shown in Table 2) demonstrate that the vent pressure does not change after thermal oxidative aging. Additionally, gel permeation chromatography analysis results (shown in Table 3) demonstrate that the molecular weight of the HIPS product increases minimally after 10 weeks at 71° C. Accordingly, oxidation of HIPS and AIM® should not be a significant problem in this application.

TABLE 2

| Material | Vent Pressure, (psi)* |
| --- | --- |
| HIPS | 769 ± 27 |
| HIPS - aged 10 weeks in air at 71° C. | 804 ± 50 |

*All data presented in this document with ± standard deviation

TABLE 3

| Material | Number Average Molecular Weight, Mn | Weight Average Molecular Weight, Mw | Polydispersity (Mn/Mw) |
| --- | --- | --- | --- |
| HIPS | 127,000 ± 200 | 227,000 ± 1,000 | 1.79 ± 0.01 |
| HIPS - aged 10 weeks in air at 71° C. | 129,00 ± 100 | 241,000 ± 500 | 1.88 ± 0.00 |

Glass Transition Temperature

The glass transition temperature of a plastic material is the temperature at which the amorphous phase of the material undergoes a transition from a glassy state to a flexible state involving motion of long segments in the polymer chain. Near and above the glass transition temperature, the material will undergo increased stress relaxation and creep. The glass transition temperature for various materials is shown in Table 4. The data indicates that the styrenic materials have two advantages when used as a seal for galvanic cells having an alkaline electrolyte. First, because styrenes do not absorb water, the glass transition temperature does not depend upon moisture. Second, the glass transition temperature of the polystyrene matrix, which dominates the relaxation behavior, is higher than polypropylene and nylon 66 at any moisture level. High temperatures for battery end use can be as high as 85° C. Therefore, the styrenic polymer based materials are expected to undergo less stress relaxation and less creep than nylon 66.

TABLE 4

| Material | Glass Transition Temperature, ° C. |
| --- | --- |
| Nylon 66 - dry as molded | 80° C. |
| Nylon 66 - 2.5% H$_2$O | 40° C. |
| Nylon 66 - 8.5% H$_2$O | −15° C. |
| Talc Filled Polypropylene Homopolymer | 11° C. |
| Impact Modified SPS | 100° C. |
| Impact Modified GPS | 100° C. |
| HIPS | 100° C. |
| AIM | 100° C. |

Linear Thermal Expansion

Thermal cycling of batteries occurs during their lifetime. Accordingly, preferred seal materials should undergo minimal thermal expansion, i.e., have lower co-efficiency of linear thermal expansion. The data shown in Table 5 indicates that, except for general purpose polystyrene, styrene materials have a co-efficient of linear thermal expansion which is as low or lower than nylon.

TABLE 5

| Material | Coefficient of linear thermal expansion × 10$^{-5}$(cm/cm/K) @ 25° C. |
| --- | --- |
| Nylon 66 | 8.1 |
| Talc Filled Polypropylene Homopolymer | 9.8 |
| Impact Modified SPS | 6.8 |
| Impact Modified GPS | 9.0 |
| HIPS | 6.8 |
| AIM | 8.1 |

Deflection Temperature Under Load—ASTM D648

The heat resistance of a galvanic seal is crucial to maintaining a seal and preventing leakage of electrolyte. The deflection temperature under load (DTUL) is a normalized method of determining the temperature at which a material is deflected under a specified amount of load. A higher DTUL indicates that a material has better resistance properties. The data shown in Table 6 indicates that at the lowest stress, nylon 66 has the most heat resistance. However, at loads closer to those normally experienced by a seal in a galvanic cell, AIM° with low molded-in stress and impact modified syndiotactic polystyrene show the most heat resistance. Nylon 66 has less heat resistance as it absorbs moisture. The styrene based materials do not have this deficiency because they do not absorb water. From this analysis, styrenic based materials are expected to have better heat resistance properties, as they relate to seals for galvanic cells, than nylon and filled polypropylene.

TABLE 6

| Material | @ 66 psi (° C.) | @ 264 psi (° C.) |
| --- | --- | --- |
| Nylon 66 - dry as molded | 210–243 | 65–90 |
| Talc Filled Polypropylene Homopolymer | — | 82 |
| Impact Modified SPS | 100 | 104 |
| Impact Modified GPPS | — | 78 |
| HIPS | — | 78–82 |
| AIM - low molded-in stress | 96 | 93 |
| AIM - high molded-in stress | 85 | 74 |

Physical Properties

A comparison of the ultimate tensile strength, ultimate elongation, and toughness (notched Izod) of various materials is set forth in Tables 7, 8 and 9, respectively. Table 7 shows that the ultimate tensile strength of the styrenic polymer based materials is less than 50% of the ultimate tensile strength of nylon 66, and about the same or lower than the ultimate tensile strength of talc filled polypropylene homopolymer. The lower ultimate tensile strength of styrenic based polymeric materials is an advantage with respect to the molding of seals for galvanic cells. In particular, because of the lower ultimate tensile strength of the styrenic polymer based materials, they can be molded with relatively thicker sections, which makes the molding process easier.

TABLE 7

| Material | Ultimate Tensile Strength (psi) |
| --- | --- |
| Nylon 66 (dry) | 12,000 |
| Nylon 66 (2.5% H$_2$O) | 11,200 |
| Talc Filled Polypropylene Homopolymer | 5,300 |
| Impact Modified SPS | 6,100 |
| Impact Modified GPPS | 5,400 |
| HIPS | 3,700 |
| AIM | 3,200 |

As shown in Table 8, the styrenic polymer based materials, especially the impact modified styrenic materials, and most particularly the impact modified syndiotactic polystyrene, have lower percentage elongation at break than nylon 66. The lower percentage elongation at break of the styrenic polymer based materials may be advantageously employed in the fabrication of galvanic cells. In particular, the amount of internal volume of the galvanic cell which is needed to allow expansion and rupture of the seal in the event of excessive internal pressure can be significantly reduced. A reduction in the amount of space needed for expansion and rupture of the seal in the event of excessive pressure within the galvanic cell can be advantageously utilized for other purposes, such as to design cells having improved service life or discharge capacity.

TABLE 8

| Material | % Elongation at Break |
| --- | --- |
| Nylon 66 (dry) | 52 |
| Nylon (2.5% H$_2$O) | ≧300 |
| Impact Modified SPS | 4 |
| Impact Modified GPPS | 25 |
| HIPS | 35 |
| AIM | 50 |

The result shown in Table 9 demonstrates that the styrenic based polymer materials are generally as tough or tougher than nylon 66. This increased toughness decreases leakage due to cracking or breakage of the seal during installation of the seal into a galvanic cell.

TABLE 9

| Material | (ft lb/in) |
| --- | --- |
| Nylon 66 (dry) | 1.0 |
| Nylon 66 (2.5% H$_2$O) | 2.1 |
| Impact Modified SPS | 1.0 |
| Impact Modified GPPS | 4.8 |
| HIPS | 2.5 |
| AIM | 5.5 |

Surface Energy

Leakage of aqueous galvanic cells can occur when aqueous solution travels between the plastic and metal interface in the compressive sealing zone. A lower surface energy plastic will inhibit this migration compared to a high surface energy plastic. The data shown in Tables 10 and 11 indicates that styrenic polymer based materials have lower surface energy and higher water contact angles than nylon 66. Accordingly, seals made of the styrenic polymer based materials would be expected to have inherently better leakage performance than nylon seals.

TABLE 10

| Material | Critical Surface Tension of Wetting (dynes/cm) |
| --- | --- |
| Nylon 66 | 46 |
| Polystyrene | 33 |
| Impact Modifiers | near 30 |

TABLE 11

| Material | Water Contact Angle (°) |
| --- | --- |
| Nylon 66 | 45–50* |
| all styrene based materials | 90–100 |

*Decreases with increased moisture content of nylon material and with time in contact with surface.

Moisture Absorption

Absorption of moisture has three negative effects: (1) the material requires drying before molding, (2) the molded part will change dimensions as a function of moisture content and hence relative humidity, and (3) the properties of the molded part will change as a function of moisture content, and hence relative humidity. As shown in Table 12, the styrenic polymer based materials do not absorb an appreciable amount of water and therefore do not have these unwanted side effects.

TABLE 12

| Material | Equilibrium moisture (%) content in 50% RH | Equilibrium moisture (%) content in 100% RH |
| --- | --- | --- |
| Nylon 66 | 2.5 | 8.5 |
| Polysulfone | — | 0.85 |
| Impact Modified SPS | <0.1 | <0.1 |
| Impact Modified GPPS | <0.1 | <0.1 |
| HIPS | <0.1 | <0.1 |
| AIM | <0.1 | <0.1 |

Hydrogen Permeability

Hydrogen gas is produced in many galvanic cells. Internal pressures of galvanic cells can become dangerously high. Accordingly, a seal material that allows the permeation of hydrogen will increase the safety of the cell. As shown in Table 13, the styrenic polymer based materials have a significantly higher hydrogen permeability than conventional galvanic cell seal materials (such as nylon 66, polypropylene and polysulfone).

TABLE 13

| Material | (cc · mil)/(100 in². day · atm) |
|---|---|
| Nylon 66 | 33 |
| Talc Filled Polypropylene Homopolymer | 480 |
| Polysulfone | 1800 |
| all styrene based materials | 3000 |

Injection Molding

As illustrated in Table 14, amorphous styrene tend to cool much quicker than polypropylene or nylon 66. The cooling times set forth in Table 14 are an indication of the amount of time after injection molding which is required for cooling and solidification of the molded part before it can be removed from the mold. Shorter cooling times result in shorter molding cycle times and higher production rates for a given molding apparatus.

TABLE 14

| | Cooling Time (seconds) | | |
|---|---|---|---|
| wall thickness (mm) | Amorphous Styrenes | Polypropylene | Nylon 66 |
| 0.5 | 1.0 | 1.8 | — |
| 1.0 | 2.9 | 4.5 | 3.8 |
| 1.5 | 5.7 | 8.0 | 7.0 |

Because the styrenic polymer based materials do not absorb appreciable amounts of moisture, drying of the styrenic polymer based materials is not required before molding. All nylons require strict control of the resin moisture between 0.10% and 0.25% by weight. Below 0.10% by weight solid state polymerization can occur in nylon, increasing the viscosity of the melt and making it difficult to fill the mold. Above 0.25% molded-in bubbles and flash occur.

Initial Seal Performance

As stated above, the styrenic polymer based materials have lower tensile strengths than nylon. A manifestation of this lower tensile strength is lower than pressures for seals having a given thickness in the area which is designed to rupture, or styrenic based polymer seals which are thicker in the area which is designed to rupture at a given pressure. Identically configured seals made of various materials were tested to determine the pressure at which the vent area of the seal would rupture. These results are set forth in Table 15. Because of the lower tensile strength of the styrenic polymer based materials, the rupture areas of the seals can be made thicker. This allows easier injection molding of the seals.

TABLE 15

| Material | Vent Pressure, (psi) |
|---|---|
| Nylon 66 | near 1200 |
| SPS + 10% Styrenic Impact Modifier | 752 ± 102 |
| SPS + 20% Styrenic Impact Modifier | 567 ± 99 |
| SPS + 10% Olefinic Impact Modifier | 457 ± 91 |
| GPPS + 10% Styrenic Impact Modifier | 994 ± 48 |
| HIPS | 769 ± 27 |

SUMMARY OF EXPERMENTAL RESULTS

The data set forth above demonstrates that the impact modified styrenic polymer blends have highly advantageous properties for use in forming a seal for a galvanic cell, especially seals for cells having an alkaline electrolyte. The data show that polyamides (such as nylon) are susceptible to chemical attack by the chemical environment of the battery. Polyamides also absorb moisture from the environment that change their dimensions and mechanical properties. Polypropylenes (mineral filled and un-filled) undergo extensive softening at temperatures experienced by the battery (e.g., 70–80° C.) which can cause leakage and unreliable performance. Polysulfone is costly, requires extremely high temperatures and low moisture levels to properly manufacture the seal via injection molding.

Polystyrenes of various tacticities and levels of impact modification (through compounding with elastomers) are not susceptible to chemical attacks by the chemistry of an alkaline galvanic cell, do not absorb appreciable moisture, do not soften until temperatures above which polypropylene (mineral filled and un-filled) will soften and are easily fabricated via injection molding, as they do not require drying and can be processed at much lower temperatures than polysulfone.

For use of a galvanic cell seal, polystyrene requires toughening by blending with elastomeric polymers (impact modification agents). However, too much impact modification is not desirable, but will instead lead to softening of the polystyrene at high temperature (70–80° C.). Experimentation has shown that polyolefin or hydrogenated rubber/styrene are two types of elastomers that are acceptable for use in impact modification. However, any rubbery polymeric material may function in this application.

Atactic or syndiotactic polystyrene are acceptable for use in alkaline galvanic cells. Syndiotactic polystyrene form crystalline microstructure while the atactic polystyrene is amorphous. Both atactic and syndiotactic polystyrene have a glass transition temperature of 100° C. Near and above this temperature, syndiotactic polystyrene is preferred because the crystalline structure will maintain the mechanical strength of the materials while the atactic polystyrene will soften due to the absence of the crystallites, which do not melt until 270° C. Hence, in applications near or above 100° C. syndiotactic polystyrene is highly preferred.

Cell Trial

AA seals were molded from NORYL® EM6101. These seals were molded with a mold temperature 200° F. and a melt temperature of 560° F. Two hundred seals were assembled into collectors and then assembled into AA cells.

Chemical Stability of NORYL®

One-eighth inch thick plaques of NORYL® EM6101 were molded. Sections of these were placed in 37% KOH or an $MnO_2$ slurry with KOH at 71° C. for 16 weeks. These samples were then analyzed for chemical degradation by measuring their molecular weight via gel permeation chromatography (GPC). If any degradation was to occur, it would be concentrated at the surface where the NORYL® was in contact with the corrosive environment. Therefore, the upper 10 μm of the samples' surfaces were collected by slicing it off with a microtome. It was this 10 μm thick shaving that was dissolved for GPC analysis.

GPC analysis was performed.

Molecular weight statistics were calculated using the following definitions.

Number Average Molecular Weight, $Mn=\Sigma N_i M_i/\Sigma N_i$

Weight Average Molecular Weight, $Mn=\Sigma N_i M^2_i/\Sigma N_i M_i$

Wherein $N_i$ is the number of polymer chains of molecular weight $M_i$

The number average molecular weight is simply the mean weight of all the polymer chains in the sample. The weight average molecular weight is the second moment of the distribution where the chains with higher weight count more toward its value. If the polymer chains in a sample are all equal in length then the number average and weight average are equal (the polydispersity (Mn/Mw) is unity).

RESULTS AND DISCUSSION

Chemical Compatibility of NORYL

Table 16 shows the GPC results from accelerated aging of NORYL® EM6101. The data reveals that the molecular weight of the surface of NORYL® EM6101 does not change with treatment in the harsh KOH and $MnO_2$ environments. As shown previously, HIPS is much more stable to these harsh environments than Zytel® 101F. Table 16 shows that adding PPO to HIPS does not decrease the stability of HIPS since no hydrolytic or oxidative chain scission occurred during the treatment of the NORYL.

TABLE 16

|  | CONTROL | 71° C. KOH | 71° C. $MnO_2$ |
| --- | --- | --- | --- |
| Mn | 8,000 | 9,000 | 8,000 |
| Mw | 36,000 | 35,000 | 32,000 |
| PDI 5000 | 22,000 | 19,000 | 18,000 |

Improved Thermal and Creep Properties

Table 17 shows the heat defection temperatures (HDT) of Zytel® 101F, and NORYL® EM6101. Heat deflection temperatures are obtained by placing a fixed load on a test specimen and the heat of the specimen is increased until the specimen softens enough to deflect a given distance. Therefore, HDT measures the creep of a material as temperature increases. The higher the HDT, the more resistance the material is to heat and creep. The data clearly show that NORYL® EM6101 is the most resistant material to heat and creep. The increased resistance is due to the PPO in the NORYL.

TABLE 17

| MATERIAL | HEAT DEFLECTION TEMPERATURE |
| --- | --- |
| Nylon 66-dry | 90 |
| HIPS | 78 |
| Impact Modified SPS | 80 |
| NORYL ® EM6101 | 121 |

Improved Stress Relaxation Properties

Figure 6:
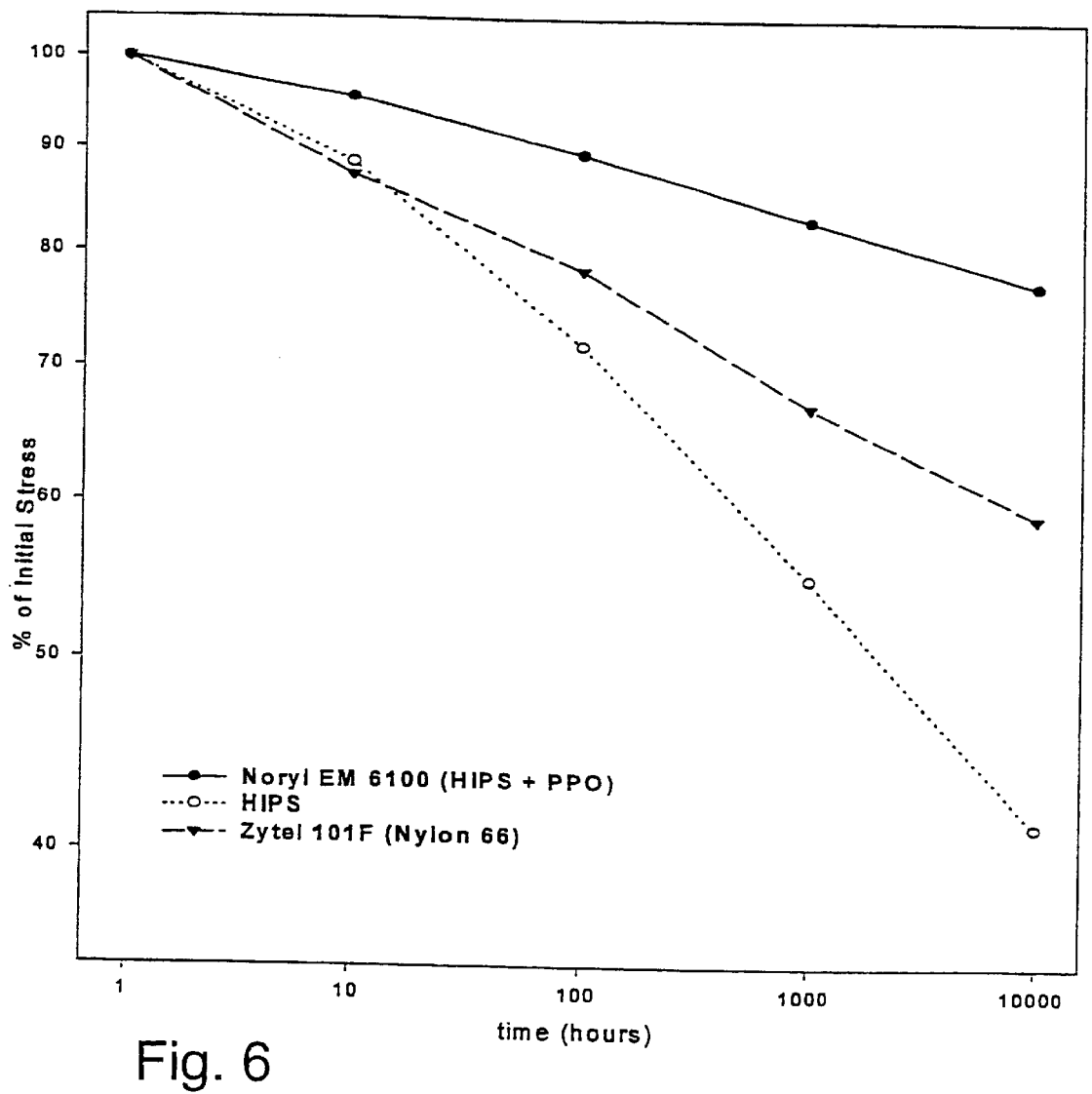
FIG. 6 is a graph of stress relaxation verses time at room temperature for NORYL® EM6100, HIPS and ZYTEL® 101F.
Figure 7:
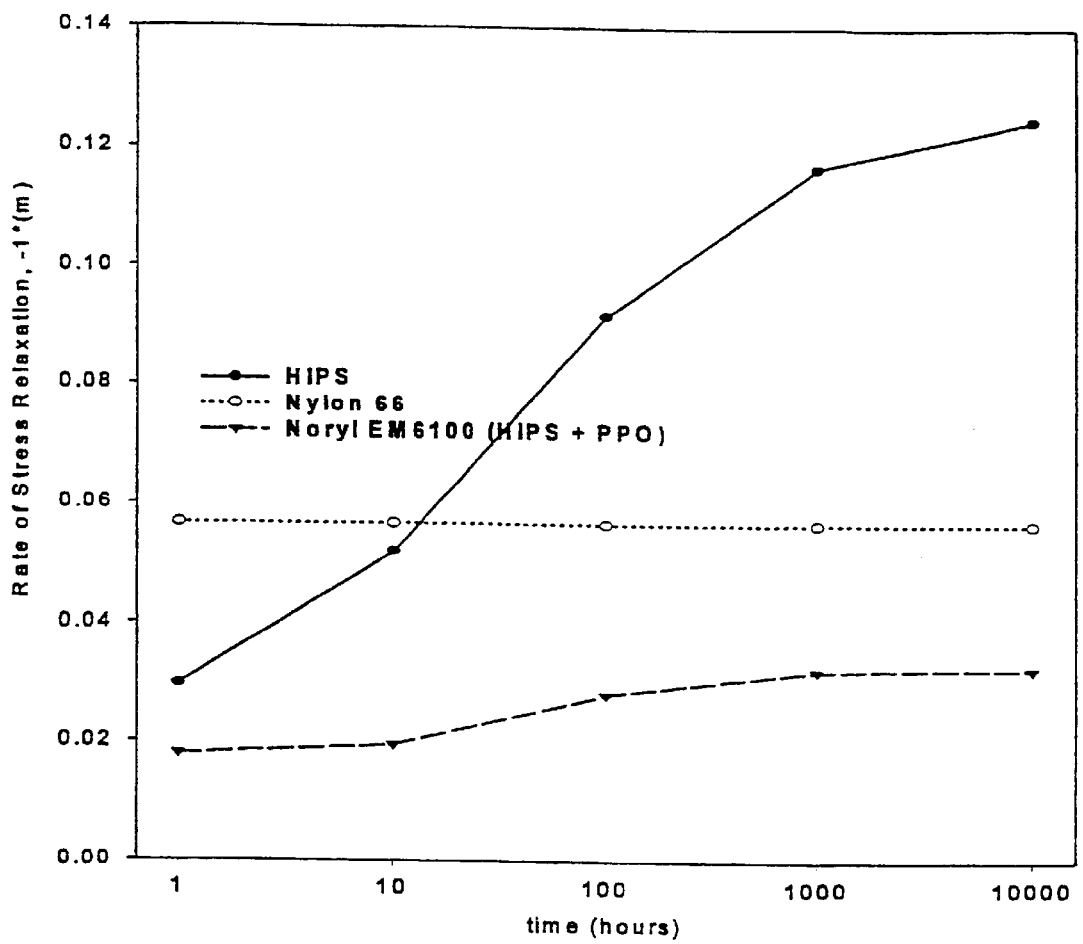
FIG. 7 is a graph of rate of stress relaxation verses time for NORYL® EM6100, HIPS and ZYTEL® 101F.

The increased HDT of NORYL's would suggest that the rate of stress relaxation of these materials should also be decreased, lending to improved leakage performance. FIG. 6 displays the stress relaxation of Zytel® 101F, HIPS, and NORYL® 6100. FIG. 7 graphically displays the rate of stress relaxation. These graphs show that the stress in NORYL decays out at the lowest rate. Therefore, it is expected to maintain the compressive stress in the sealing zone of an alkaline seal the longest and hence give the best leakage resistance.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A seal for a battery having a steel can containing an electrode and electrolyte, said seal configured to electrically isolate the can from the electrode and prevent electrolyte from leaking from the battery, the seal including a relatively thin area designed to rupture in the event that the internal pressure of the battery exceeds a predetermined limit, the seal formed of a styrenic polymer blend including at least two polymers, at least one of the polymers being a styrenic polymer.

2. The seal of claim 1, wherein the styrenic polymer blend is comprised of a styrenic polymer and an impact modifier.

3. The seal of claim 1, wherein the styrenic polymer blend is comprised of from about 50 to about 95% by weight of a styrenic polymer and from about 5 to about 40% by weight of an impact modifying agent which increases the toughness of the styrenic polymer, based on the total weight of the styrenic polymer and the impact modifier.

4. The seal of claim 2, wherein the styrenic polymer comprises polystyrene.

5. The seal of claim 2, wherein the styrenic polymer is syndiotactic polystyrene.

6. The seal of claim 4, wherein the impact modifier is a polyolefinic thermoplastic elastomer.

7. The seal of claim 4, wherein the impact modifier is a tri-block copolymer.

8. The seal of claim 7, wherein the tri-block copolymer is selected from the group consisting of styrene-butadiene-styrene, styrene-isoprene-styrene, styrene-ethylene/butylene-styrene, and styrene-ethylene/propylene-styrene.

9. The seal of claim 1, wherein the styrenic polymer blend is high impact polystyrene comprising a polystyrene phase and discrete polybutadiene phases.

10. The seal of claim 1, wherein the styrenic polymer blend includes an anti-stress relaxation agent.

11. The seal of claim 10, wherein the anti-stress relaxation agent is poly(phenylene oxide).

12. The seal of claim 10, wherein the anti-stress relaxation agent is selected from the group consisting of talc, calcium carbonate, carbon black, and silica.

13. A seal for a battery having a steel can containing an electrode and electrolyte, the seal configured to electrically isolate the can from the electrode and prevent electrolyte from leaking from the battery, the seal having a relatively thin area designed to rupture in the event that the internal pressure of the battery exceeds a predetermined limit, the seal formed of a styrenic polymer blend comprising from about 70% to about 95% of a styrenic polymer and from about 5% to about 30% of an impact modifier which increases the toughness of the styrenic polymer, based on the total weight of the styrenic polymer and the impact modifier.

14. The seal of claim 13, wherein the styrenic polymer comprises syndiotactic polystyrene.

15. The seal of claim 14 where the impact modifier is a polyolefinic thermoplastic elastomer.

16. The seal of claim 15, wherein the impact modifier is a tri-block copolymer.

17. The seal of claim 16, wherein the tri-block copolymer is selected from the group consisting of styrene-butadiene-styrene, styrene-isoprene-styrene, styrene-ethylene/butylene-styrene and styrene-ethylene/propylene-styrene.

18. The seal of claim 13, wherein the styrenic polymer blend includes an anti-stress relaxation agent.

19. The seal of claim 18, wherein the anti-stress relaxation agent is poly(phenylene oxide).

20. The seal of claim 18, wherein the anti-stress relaxation agent is selected from the group consisting of talc, calcium carbonate, carbon black, and silica.

21. A sealed battery including a steel housing containing an electrode and electrolyte, and a seal, the seal configured to electrically isolate the steel housing from the electrode and prevent electrolyte from leaking from the battery, the seal having a relatively thin area designed to rupture in the event that the internal pressure of the battery exceeds a predetermined limit, the seal being formed of a styrenic polymer blend including at least two polymers, at least one of the polymers being a styrenic polymer.

22. The cell of claim 21, wherein the styrenic polymer blend is comprised of a styrenic polymer and an impact modifying agent which increases the toughness of the styrenic polymer.

23. The cell of claim 22, wherein the styrenic polymer blend is comprised of from about 70% to about 95% of the styrenic polymer and from about 5% to about 30% of the impact modifying agent.

24. The cell of claim 23, wherein the styrenic polymer comprises atactic polystyrene, syndiotactic polystyrene, or both.

25. The cell of claim 24, wherein the impact modifier is a polyolefinic thermoplastic elastomer.

26. The cell of claim 24, wherein the impact modifier is a tri-block copolymer.

27. The cell of claim 26, wherein the tri-block copolymer is selected from the group consisting of styrene-butadiene-styrene, styrene-isoprene-styrene, styrene-ethylene/butylene-styrene, and styrene-ethylene/propylene-styrene.

28. The cell of claim 21, wherein the styrenic polymer blend is high impact polystyrene containing a polystyrene phase and discrete polybutadiene phases.

29. The cell of claim 21, wherein the styrenic polymer blend includes an anti-stress relaxation agent.

30. The cell of claim 29, wherein the anti-stress relaxation agent is poly(phenylene oxide).

31. The cell of claim 29, wherein the anti-stress relaxation agent is selected from the group consisting of talc, calcium carbonate, carbon black, and silica.

* * * * *